Patented Jan. 7, 1941

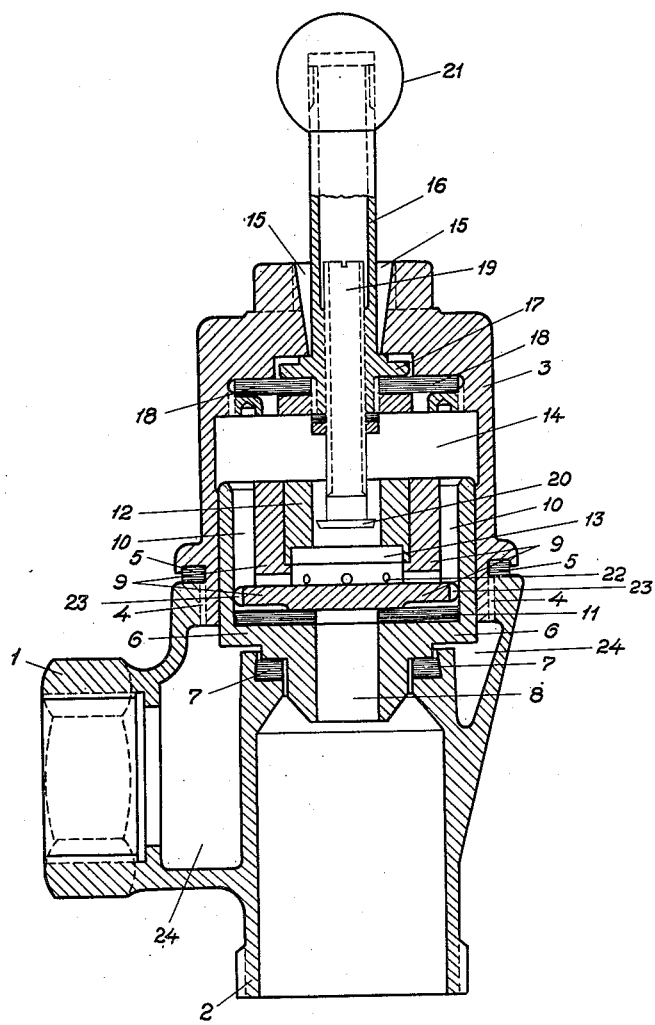

2,227,907

UNITED STATES PATENT OFFICE 2,227,907

FLUSH VALVE FOR WATER CLOSETS

Uuno Lautiainen and Nils August Etola, Helsingfors, Finland; said Lautiainen assignor to Rafael Arala, Helsingfors, Finland Application April 23, 1938, Serial No. 203,771
In Sweden March 23, 1938

4 Claims. (Cl. 137—93)

This invention relates to a flush valve for water closets. It is characterized by the fact that the valve element is energized for flushing operation by a very slight movement of an extending handle, such handle returning to its normal position immediately when hand pressure upon it is removed.

The flush valve of the present invention also has as a feature automatic discontinuation of the flushing action even though the hand pressure on the handle has not permitted all the parts to resume a normal non-flushing position.

The appended drawing discloses one manner in which the present invention is incorporated in a flush valve.

Referring to the drawing—

The valve comprises lower casing 2 and an upper housing 3 threaded together as at 4, the water pressure feed to the assembled sections being at 1 which is at right angles to the outlet passage of the lower casing 2.

On the upper end of the flush outlet is seated a primary release valve 6 cylindrical in form and reduced in size at the lower portion as shown.

The release valve 6 seats on the packing 7. The center of the release valve 6 is apertured as at 8, the aperture normally being closed by the secondary regulating valve 9 positioned inside the primary release valve 6 and seating on packing 11.

Some free space or clearance 10 is left between the inner wall of the release valve 6 and the outer wall of the upper portion of the regulating valve 9. Inside the regulating valve 9 a cylindrical bushing 12 is movably disposed, the lower end of which is counterbored as at 13. A certain space is provided between the inside wall of the valve housing 3 and the outer wall of the primary valve 6, so that water may pass slowly from the chamber 24 into the chamber 14. In this manner, balance of pressure is established on opposite sides of the primary valve 6 and, as a result, the valve 6 will tightly press against its seat 7, preventing the flow of water from inlet 1 to the outlet 2. When the pressure in chamber 14 is reduced, an unbalance in pressure results as more fully described hereinafter. The release valve 6 with its attendant and cooperating parts as described may, under the influence of such a differential in pressure, move upwardly and be accommodated in the chamber 14 of the upper section 3 of the valve body.

The housing 3 of the valve body is apertured as at 15 to receive a hollow operating rod or lever 16 provided at its lower end with a flange 17 against which is a flexible disc packing member 18 held in place by a threaded washer as shown. The free portion of this flexible packing member 18 is confined against a shoulder within the upper part 3 of the valve body by a threaded spanner nut as indicated. Thus the lever member 16 is flexibly mounted in water tight relation to the top part 3 of the valve body and may be canted as will be hereinafter described. The lower end of lever 16 has a flange 20 dependent to an adjustable extent inside the bushing 12 and which constitutes the end of a threaded screw 19 adjustable from outside by removal of the threaded ball cap 21 on the lever 16 which can be used as a handle. The rod 16 can also be made of solid material, in which case the screw 19 is adjusted from its lower end when the body 3 is first unscrewed. The purpose of screw 19 is to limit the upward movement of the primary valve 6, the secondary valve 9 and the bushing 12 carried by the latter. The flange 20 on the screw 19 is adapted to engage the shoulder 13 provided on the movable bushing 12. Engagement between flange 20 and bushing 12 will occur when the lever rod 16 and with it the screw 19 are tilted during the raised position of the secondary valve 9 and the bushing 12. In that event, the bushing 12 will remain in engagement with flange 20 as long as the lever 16 is in tilted position, even if the secondary valve 9 has moved away again from bushing 12 and returned to its lower rest position.

In the sides of the regulating valve 9 near the bottom are the holes 22, which pierce the cylindrical wall. In the enlarged lower part of the valve 9, which acts as a guide inside the release valve 6, are the slots 23 to permit flow of water.

The action of the valve is as follows:

When water under pressure admitted through the inlet pipe fills the chamber 24, water will slowly penetrate into chamber 14 by way of the space between the inside wall of the body 3 and the outside wall of the primary release valve 6 into the space 14, thereby filling with water the secondary regulating valve 9 and the bushing 12 seated therein; thus, the chamber 24, on one side of valve 6, and the chamber 14, on the opposite side of valve 6, are subjected to the same pressure. The release valve 6 and regulating valve 9 are therefore firmly closed against their seats. When the handle 21 is canted in any direction, the flange 20 displaces the bushing 12 to the side, whereupon the regulating valve 9, which surrounds same, also becomes tilted, its lower part is then off its packing, and water from above flows into the aperture 8, and pressure is withdrawn from the space 14. Thus the water pressure in the chamber 24 immediately pushes the primary release valve 6 upwards, and water is discharged into the flush pipe 2 under the release valve 6. The release valve 6 rises as high as the flange 20 permits. If the handle 21 remains in tilted position, the regulating valve 9 cannot press down firmly against its seat and water will continue to flow into the flush pipe 2. To prevent this, a shoulder 13 is provided on the lower part of the bushing 12, and the flange 20 sinks into the recess formed by this shoulder when the bushing 12 is lifted up by the release valve. Thus the bushing 12 will remain suspended from the flange 20 if the rod 16 be continuously kept in tilted position, while the secondary regulating valve 9 slides away from the bushing 12 and sinks downwards by means of its own weight. The object of the holes 22 and slots 23 is to facilitate the sinking down of the valve by letting the water flow through. The release valve 6 also begins to sink down onto its seat by reason of its own weight and that of the regulating valve 9. When the pressure in the space 14 equals that of the pipe line, all the valves are again firmly closed. When the rod 16 is released it assumes, by virtue of its packing, its original vertical position, and the bushing 12 can move down. The valve is then ready for a new flushing. The time of the flushing may be adjusted by the screw 19, since the position of the flange 20 determines how high the valves 6 and 9 may rise.

We claim:

1. A flush valve having a water inlet, a flushing outlet, and a closed top, a valve seat above the outlet, a hollow reciprocatory primary valve cooperating with the seat and guided in the top, means whereby water may flow from the inlet side of said primary valve to the opposite side thereof to establish a balancing water pressure on opposed faces of the primary valve for maintaining the same in seat engaging position, a tiltable secondary valve within the primary valve and adapted to close an opening through said primary valve, whereby with movement of said secondary valve, water upon one side of said primary valve is permitted to flow into said outlet to relieve the pressure on one side of said primary valve, and permit the preponderating pressure on the other side of said valve to open said valve, a tiltable lever for unseating the secondary valve, and co-operating means upon said lever and said secondary valve adapted to be engaged to permit closing of said secondary valve irrespective of the direction of movement or of the position of said lever.

2. A flush valve comprising a casing having a water inlet, a flushing outlet, and a closed top, a valve seat above the outlet, a hollow primary valve for cooperation with the seat and having a guiding connection with the closed top, means whereby water may flow from the inlet side of said primary valve to the opposite side thereof for establishing a balancing water pressure on opposed faces of the valve for normally maintaining same in seat engaging position, the primary valve having a passage leading from its interior to the outlet, a secondary valve movable with and independently of said primary valve cooperating with the passage for permitting water upon one side of said primary valve to flow into said outlet to relieve the pressure on one side of said primary valve, and permit the preponderating pressure on the other side of said valve to open said valve, and a lever rockably mounted in the closed top and having a lower free end for directly engaging and unseating the secondary valve upon rocking movement of the lever, the free end being normally out of engagement with the secondary valve, said lever and said secondary valve having cooperating means to permit closing of said secondary valve, irrespective of the position of said lever.

3. A flush valve embodying therein a casing having a water inlet, a flushing outlet, and a lever housing having an opening therethrough, a tiltable lever, a flexible gasket co-operating with the lever housing of said casing and said lever to close the opening through said housing and permit tilting movement of said lever, means forming a valve seat adjacent said outlet, said casing having chambers adjacent said inlet and toward the said housing respectively, a hollow primary valve co-operating with said valve seat and having a loose sliding connection within said last named chamber, said primary valve having an opening leading from said last named chamber to said outlet, whereby water may flow about said valve from one of said chambers to the other to establish a balancing water pressure upon opposite sides of said valve, a tiltable secondary valve within and movable in relation to and independently of said primary valve, said tiltable secondary valve being within the operative range of one end of said lever, and co-operating means carried by said secondary valve and said lever to prevent closing of said secondary valve, irrespective of the position of said lever, the said end of the lever forming a stop for the upward movement of said valves, and means for adjusting the length of said lever, whereby the length of the flushing period may be regulated.

4. A flush valve embodying therein a casing having a water inlet, a flushing outlet, and a top having an opening therethrough, a tiltable lever, a flexible gasket co-operating with the top of said casing and said lever to close the opening through said top and permit tilting movement of said lever, means forming a valve seat adjacent said outlet, said casing having chambers adjacent said inlet and toward the top of said casing respectively, a hollow primary valve co-operating with said valve seat and having a loose sliding connection within said last named chamber, said primary valve having an opening leading from said last named chamber to said outlet, whereby water may flow about said valve from one of said chambers to the other to establish a balancing water pressure upon opposite sides of said valve, a tiltable secondary valve within and movable in relation to and independently of said primary valve, said tiltable secondary valve being within the operative range of one end of said lever, a flange carried by one end of said lever, a movable contact member carried by said secondary valve, a shoulder upon said contact member, said shoulder being engageable by said flange, whereby said secondary valve may move to closed position.

UUNO LAUTIAINEN.
NILS AUGUST ETOLA.